United States Patent Office 3,262,927
Patented July 26, 1966

3,262,927
3,3'-DITHIOBIS(3-AZABICYCLO[3.2.2]NONANE)
John J. D'Amico, Dunbar, W. Va., assignor to Monsanto Company, St. Louis, Mo., a corporation of Delaware
No Drawing. Filed June 1, 1965, Ser. No. 460,509
1 Claim. (Cl. 260—239)

This invention relates to the new chemical 3,3' - dithiobis (3-azabicyclo[3.2.2]nonane) which may be prepared as follows:

To a stirred solution comprising 125 grams (1.0 mole) of 3-azabicyclo[3.2.2]nonane and 1000 ml. of ethyl ether was added dropwise below the surface, over a period of one hour at 0°–10° C., 33.8 grams (0.25 mole) of sulfur chloride in 100 ml. of ether. After stirring at 0°–10° C. for three hours, 600 ml. of cold water were added and stirring continued at 10°–20° C. for 15 minutes. The small amount of solid was collected by filtration and discarded. The ether solution was washed with water until neutral and dried over sodium sulfate. Ether was removed in vacuo at a maximum temperature of 30° C./1–2 mm. and the product air-dried at 25°–30° C. After recrystallization from alcohol the white solid, obtained in 75.5% yield, melted at 121°–123° C. Analysis gave 8.63% nitrogen and 20.67% sulfur compared to 8.96% nitrogen and 20.52% sulfur calculated for $C_{16}H_{28}N_2S_2$.

The subject compound is useful as a vulcanizing agent and accelerator for vulcanization of rubbers. As illustrative of vulcanizing activity, a stock was compounded comprising:

|  | Stock, Parts by Weight | |
|---|---|---|
|  | A | B |
| Smoked sheets rubber | 100.0 | 100.0 |
| Carbon black | 50.0 | 50.0 |
| Zinc oxide | 5.0 | 5.0 |
| Stearic acid | 3.0 | 3.0 |
| Saturated hydrocarbon softener | 3.0 | 3.0 |
| 3,3'-Dithiobis(3-azabicyclo[3.2.2]nonane) | 3.0 | 3.0 |
| 2,2'-Dithiobis(benzothiazole) |  | 0.5 |

The stock was vulcanized by heating for different periods of time in the usual manner in a press at 144° C. The modulus and tensile properties of the 60-minute cure are recorded below:

|  | Stock | |
|---|---|---|
|  | A | B |
| Modulus of elasticity at 300% elongation, lbs./in.² | 1,930 | 2,600 |
| Tensile at break in lbs./in.² | 3,100 | 4,300 |
| Ultimate Elongation, percent | 440 | 450 |

Replacing the 3,3'-dithiobis(3-azabicyclo[3.2.2]nonane) in Stock B with 2.5 parts by weight of sulfur reduced the modulus and tensile to 2220 and 3000 lbs./in.², respectively.

Further to demonstrate the efficiency of the product as a vulcanizing agent, 5.05 parts by weight of 3,3'-dithiobis (3-azabicyclo[3.2.2]nonane) were substituted for the 3.0 parts in Stock A. By way of comparison, a similar stock was prepared by replacing the product of this invention with N,N'-dithiobis(morpholine), a known vulcanizing agent, on an equimolar basis (3.45 parts). The stocks were cured in a press at 144° C. for different periods of time. The following table shows the results of tests on the cured stocks:

C = stock containing 3,3' - dithiobis(3 - azabicyclo[3.2.2] nonane)
D = stock containing N,N' - dithiobis(morpholine)

TABLE I

| Stock | Cure Time in Mins. | Modulus of Elasticity At 300% Elongation in lbs./in.² | Tensile at Break in lbs./in.² | Ultimate Elongation, percent |
|---|---|---|---|---|
| C | 10 | No cure | No cure | No cure |
|  | 20 | 870 | 1,860 | 500 |
|  | 30 | 1,880 | 3,760 | 550 |
|  | 45 | 2,300 | 4,100 | 570 |
| D | 10 | No cure | No cure | No cure |
|  | 20 | 280 | 810 | 550 |
|  | 30 | 670 | 1,240 | 450 |
|  | 45 | 1,690 | 3,520 | 500 |

The new compound has the property of reducing internal friction of rubber. The following formulation was used to demonstrate this property:

| | Parts by weight |
|---|---|
| SBR 1502–1500 | 100.0 |
| Carbon black (ISAF) | 40.0 |
| 3,3' - dithiobis(3 - azabicyclo[3.2.2]nonane) | 0.5 |
| Zinc oxide | 4.0 |
| Stearic acid | 2.0 |
| Hydrocarbon oil softener | 5.0 |

The Banbury mixer was heated to 150° C. and the rubber added and mixed about 0.5 minute. Carbon black which had previously been mixed with 3,3' - dithiobis(3 - azabicyclo[3.2.2]nonane) was then added and mixing continued for about 3 minutes. Zinc oxide, stearic acid, and softener were added and the mixing continued for 1.5 minutes. The Banbury was swept down, mixing continued for 3 minutes, and the mix dumped. The mix was blended six times on an open mill at 70° C. and vulcanizable compositions prepared by adding the following ingredients at 50° C.

| | Parts by weight |
|---|---|
| Accelerator | 1.2 |
| Sulfur | 1.75 |

The stocks were cured at 144° C. and torsional hysteresis of the vulcanizates determined at room temperature by the method of Mooney and Gerke, Rubber Chemistry and Technology, 14, 35 (1941). The hysteresis valve was .146 as compared to .198 for a similarly prepared stock containing no 3,3' - dithiobis(3 - azabicyclo[3.2.2]nonane).

As a further embodiment of the invention illustrating vulcanizing action in butyl rubber previously modified to reduce internal friction, the following formulation was used:

| | Parts by weight |
|---|---|
| Butyl 217 | 100.0 |
| Carbon black (ISAF) | 40.0 |
| Modifier [1] | 1.5 |
| Zinc oxide | 5.0 |
| Stearic acid | 1.0 |
| Saturated hydrocarbon softener | 10.0 |
| Tetramethyl thiuram disulfide | 1.0 |
| 2,2'-dithiobis(benzothiazole) | 1.0 |
| 3,3'-dithiobis(3-azabicyclo[3.2.2]nonane) | 2.0 |

[1] 33⅓% N,4-dinitroso N-methyl aniline, 66⅔% inert ingredient.

Two-thirds of the carbon black pre-mixed with the modifier was added to the butyl rubber on a Banbury mixer preheated to 140° C. After mixing for 5 minutes, zinc oxide, stearic acid, hydrocarbon softener, and the remaining carbon black were added and mixing continued for 1.5 minutes. The Banbury was then swept down and mixing continued for 2 minutes. The stock was then transferred to a rubber mill at 70° C. and blended with the vulcanizing ingredients. Vulcanization was carried out by heating in a press for 45 minutes at 144° C. The vulcanizate was then tested and the results obtained are shown below:

Modulus of elasticity at 300% elongation -------- 570
Tensile at break in lbs./in.$^2$ ------------------ 1950
Ultimate elongation, percent ------------------ 670

It is intended to cover all changes and modifications of the examples of the invention herein chosen for purposes of disclosure which do not constitute departures from the spirit and scope of the invention.

What is claimed is:

3,3' - dithiobis(3 - azabicyclo[3.2.2]nonane).

No references cited.

HENRY R. JILES, *Acting Primary Examiner.*